UNITED STATES PATENT OFFICE.

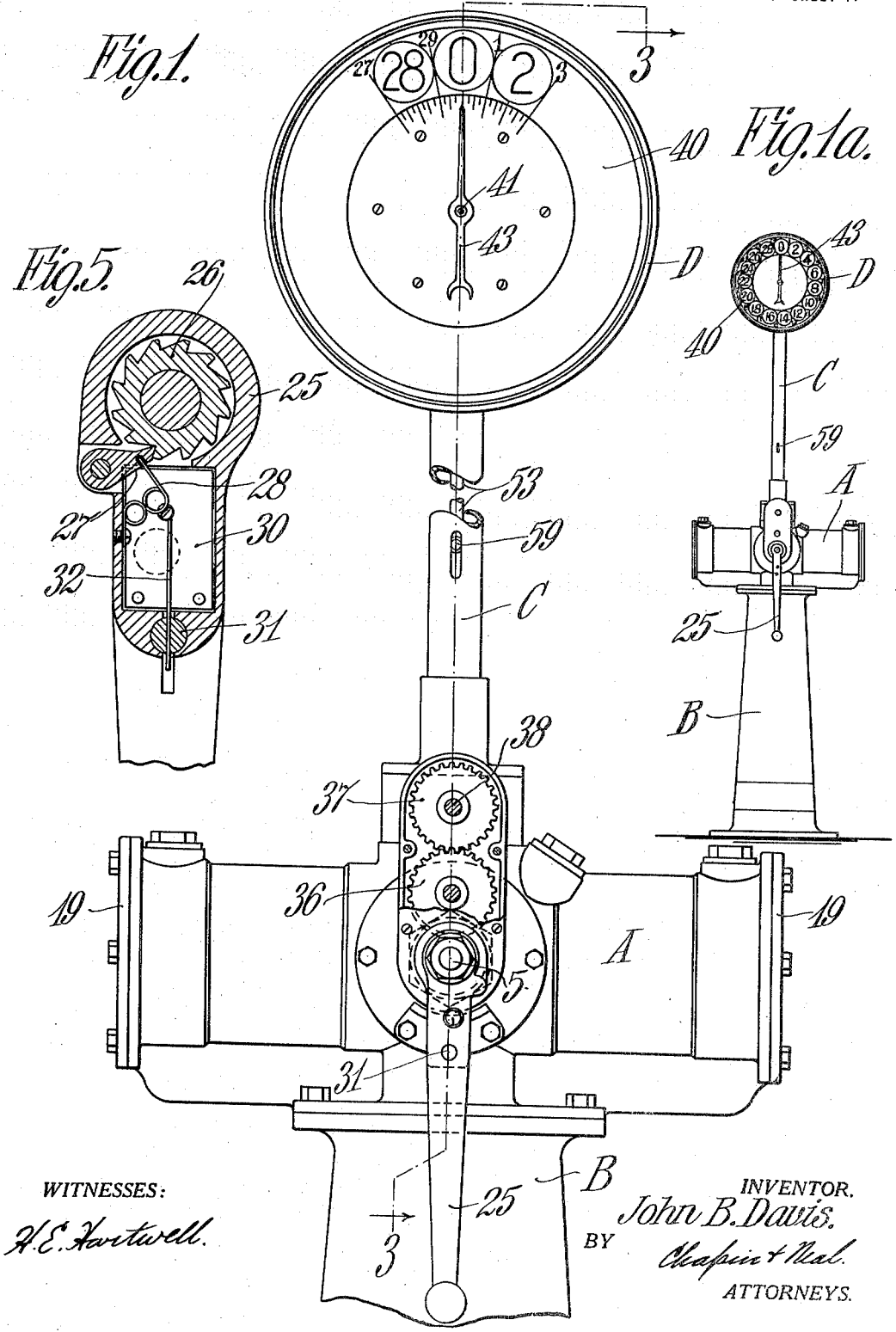

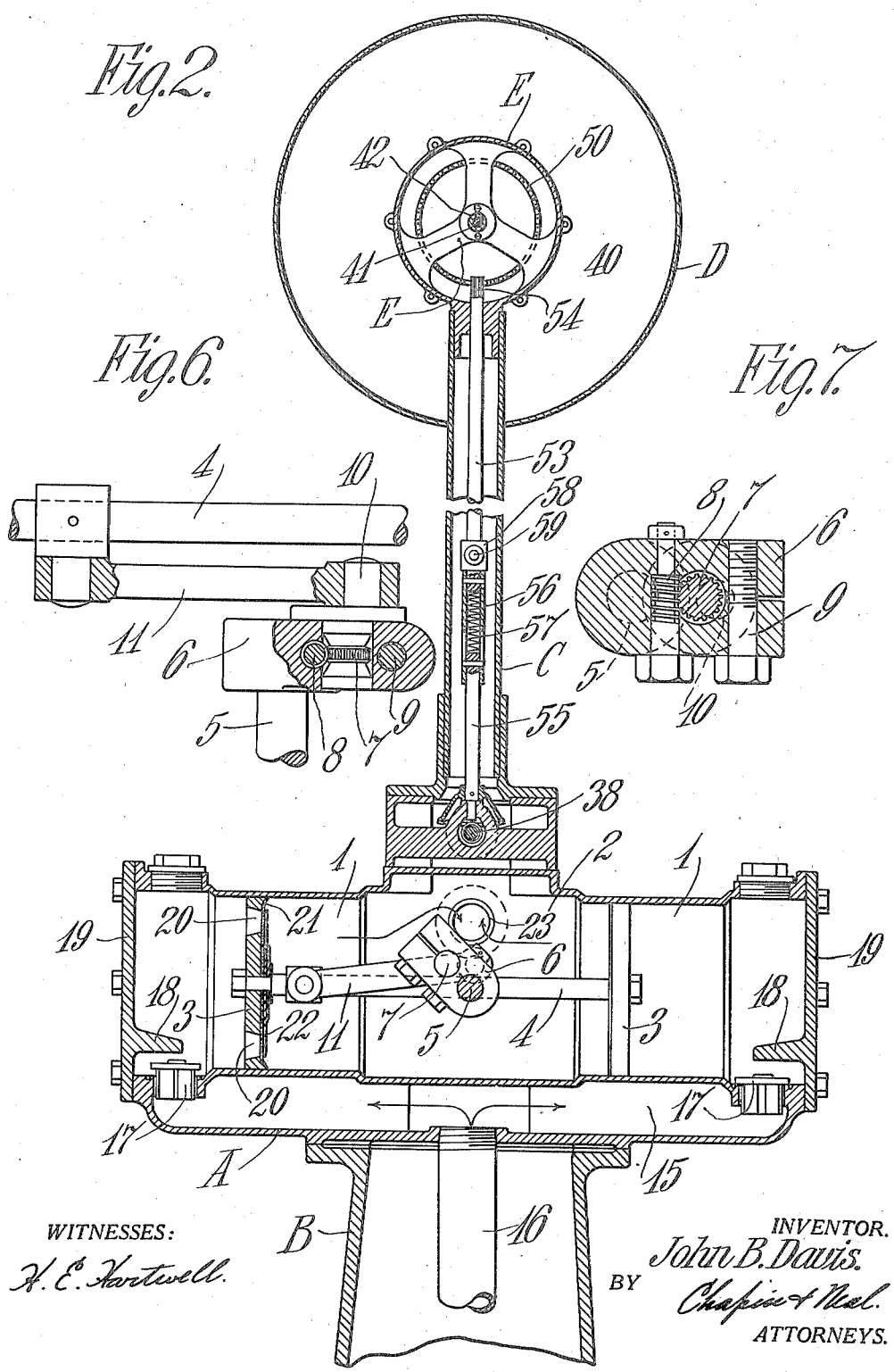

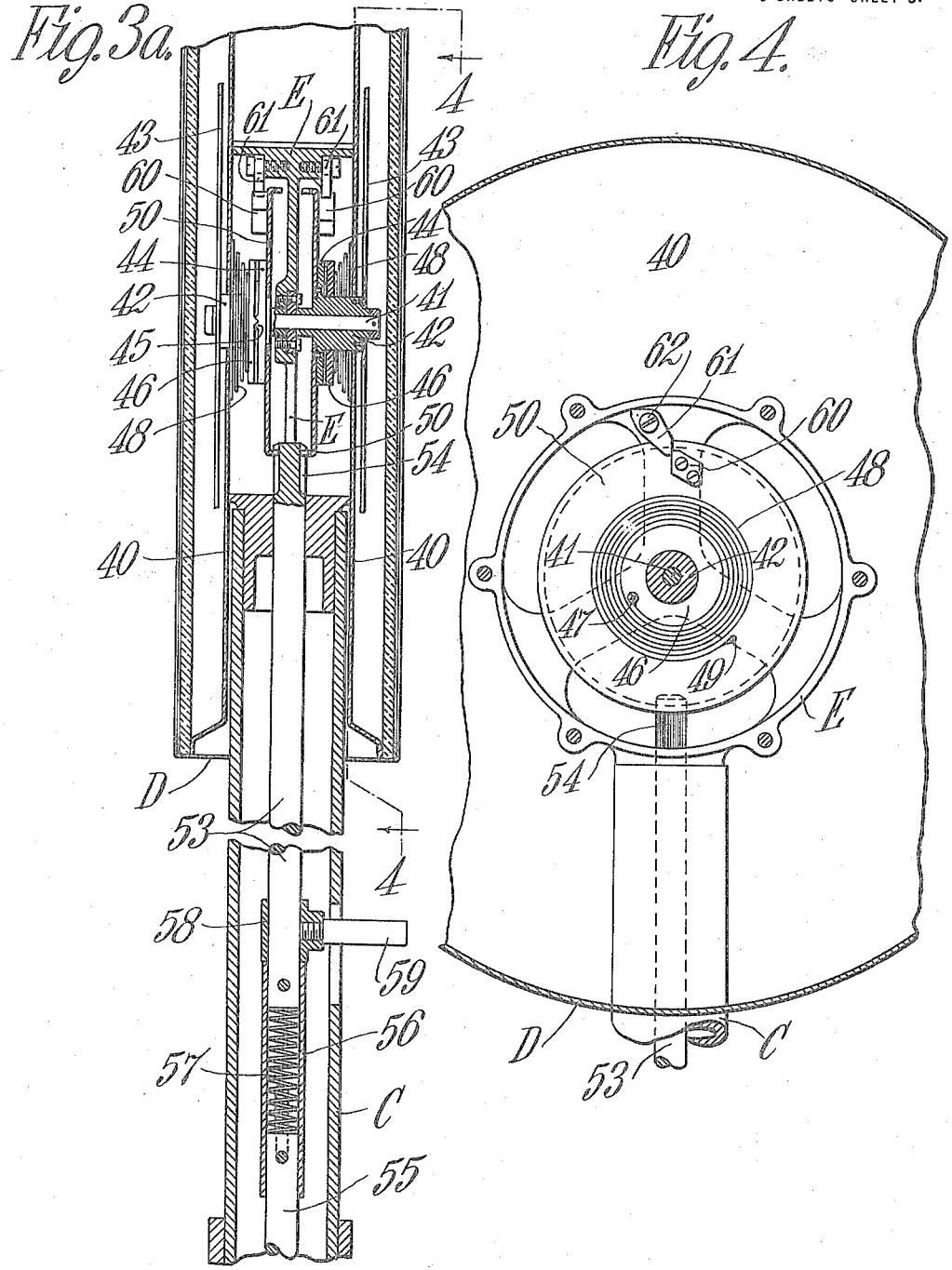

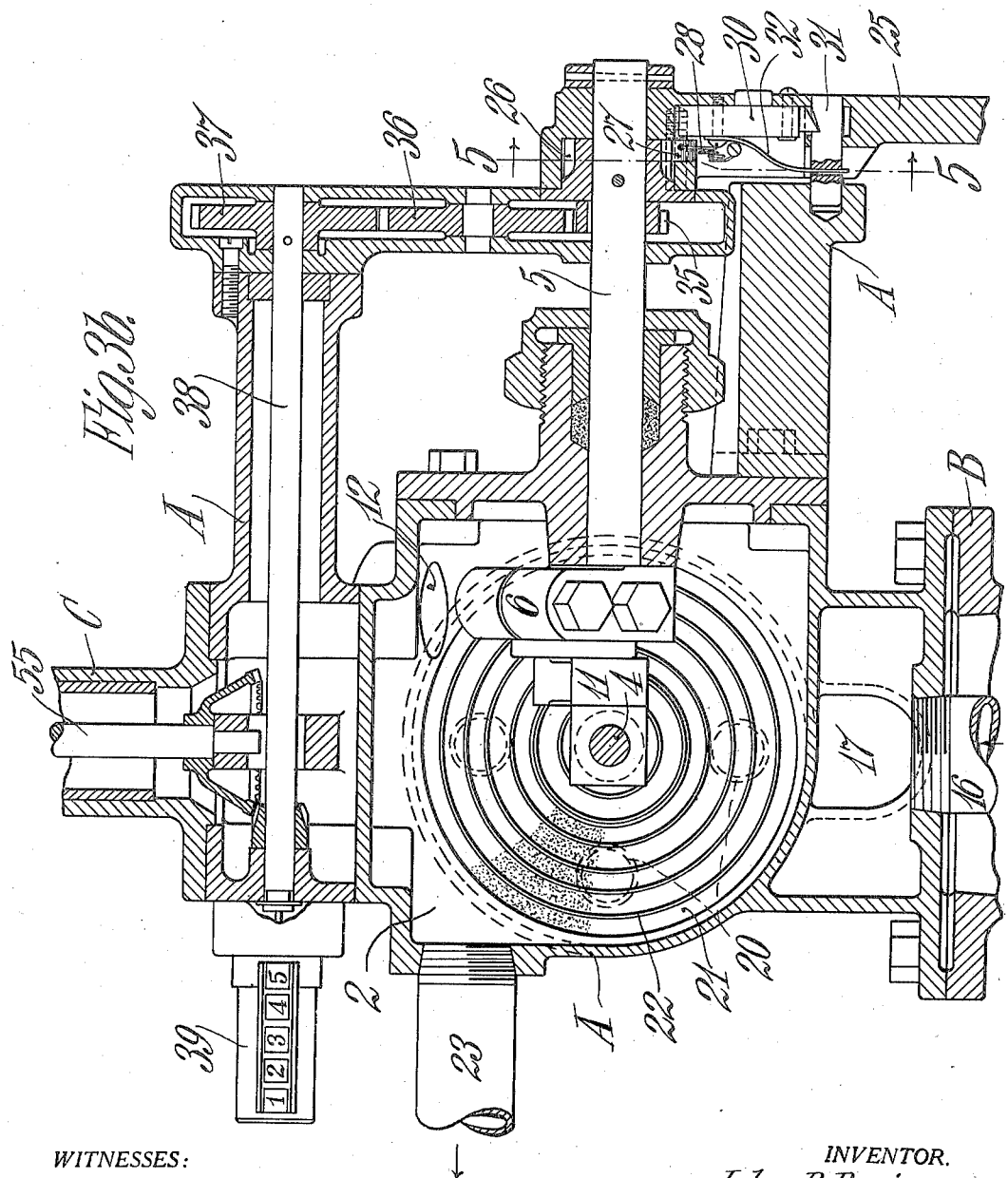

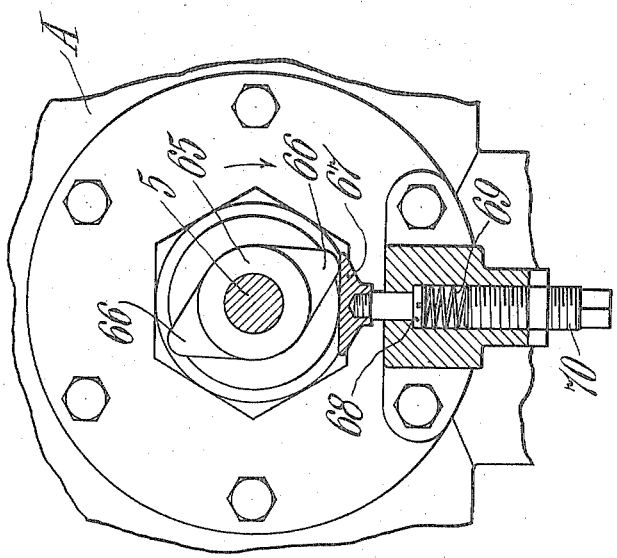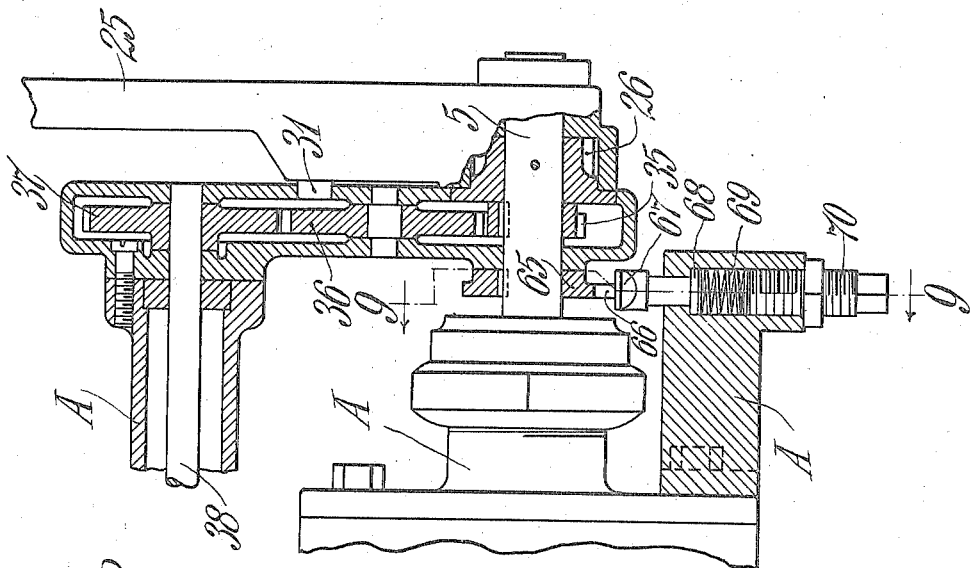

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

DISPENSING AND MEASURING PUMP.

1,275,864.     Specification of Letters Patent.     Patented Aug. 13, 1918.

Application filed November 13, 1915. Serial No. 61,397.

*To all whom it may concern:*

Be it known that I, JOHN B. DAVIS, a citizen of the United States of America, and residing in Springfield, county of Hampden, and State of Massachusetts, have invented certain new and useful Improvements in Dispensing and Measuring Pumps, of which the following is a specification.

This invention relates to improvements in dispensing or measuring pumps, such as are commonly used in dispensing gasolene and like oils.

Such pumps are commonly of the piston type which is employed, rather than the rotary type, on account of superior measuring accuracy. While gear pumps and the like operated at a given speed deliver approximately a constant quantity per revolution, the quantities are not accurately constant and vary within limits too far apart to make pumps of this class generally desirable for measuring. For example, it has been found in practice that gear pumps overmeasure when rapidly operated. The piston type of pump, as heretofore used, is efficient for measuring purposes but has disadvantages in operation. Usually piston pumps are operated by a rack and pinion device, wherein the latter is turned by a handle in one direction to lift the rack and then in a reverse direction to lower the latter. The lowering of the rack is an idle operation, since liquid is delivered on the upward stroke only, and thus valuable time is wasted. Moreover, measurement in the usual type of piston pump must start with the piston always in the same position, and the idle operation above noted is necessary to restore the piston to this position. The gear pumps thus have disadvantages in accurate measurement, and the piston pumps have disadvantages in convenient and efficient operation due to intermittent delivery as well as to the necessary positioning of the piston after each measurement. Piston pumps of the double acting type have been used heretofore and have the advantage of gear pumps in providing continuous delivery. However, the double acting piston pumps shown in the prior art are objectionable, due to the measuring system associated therewith, because the measurement cannot conveniently be started except from one given point for a cycle of operation of the pump. For example, if, in a pump designed to deliver a gallon for each cycle of operation, the pump is stopped after delivering a quart, a subsequent operation of the pump requires either the return of the parts to their original position or a rather uncertain mental calculation from the position in which the parts are left. Such an arrangement is, therefore, wholly undesirable in practice as it is not designed for convenient and accurate use. This invention is concerned with an improved measuring pump wherein the advantages of the two types of pump described are retained and the disadvantages of each above noted are eliminated.

An object of this invention is to provide a measuring pump of the piston type, wherein improved means are provided to reciprocate the piston, said means arranged for operation by continuous rotation in one direction.

Another object is to provide a measuring pump, involving double opposed pistons operable by means, continuously rotatable in one direction, to deliver a continuous flow of liquid which is characterized by the delivery of an accurately measured quantity per revolution of said means irrespective of the starting position of the pistons.

Another object of the invention is to provide in a measuring pump of the class described, improved means to adjust the stroke of the pistons, whereby the delivery of the pump may be varied within limits to secure an accurately measured quantity for each cycle of operation of the pump.

Another object of the invention is to provide in a pump arranged to deliver a measured quantity during each cycle of the operation, improved counting apparatus operable from the actuation shaft of the pump to count the revolutions thereof and thus indicate the number of measured units delivered from the pump, said apparatus being characterized by continuous, as distinguished from step by step operation, whereby the amount delivered by the pump may be determined at any instant in the cycle of operation thereof as distinguished from a relatively few periodical points in the cycle and whereby measurement of the quantities delivered can conveniently be started with the pistons in any position in their cycle.

Another object of the invention is to provide in a measuring pump, involving an actuating means operable by continuous rotation in one direction and counting devices geared up to said means, mechanism to reset said devices after the delivery of the desired measured quantity, without disturbing the position of said means, whereby measurement may be conveniently started from any point in the cycle of operation of the pump.

Another object of the invention is to provide in a pump of the type described, having a handle operable by continuous rotation in one direction to actuate the pump, a locking device to hold said handle against rotation and mechanism associated with the handle to permit it to be turned to locking position without actuation of the pump.

Other objects and advantages will appear in the detailed description and annexed claims.

Referring to the drawings as illustrated one preferred manner in which the invention may be put to use:

Figure 1 is a side elevational view of the improved measuring pump;

Fig. 1ª is a view of the complete pump showing the general arrangement and design of the assembled parts as the pump is placed in position for use;

Fig. 2 is a sectional elevation thereof;

Figs. 3ª and 3ᵇ show, respectively, upper and lower portions of the measuring pump with parts broken away and should be considered as joined one to the other to form a complete figure, which figure is a cross-sectional view taken on the line 3—3 of Fig. 1 and looking in the direction of the arrows;

Fig. 4 is a partial sectional elevation taken on the line 4—4 of Fig. 3ª and looking in the direction of the arrows;

Fig. 5 is a sectional view taken on the line 5—5 of Fig. 3ᵇ and looking in the direction of the arrows;

Fig. 6 is a partial plan view illustrative of the adjustable driving connections for the pump pistons;

Fig. 7 is a sectional elevation of Fig. 6;

Fig. 8 is a view generally similar to Fig. 3ᵇ with parts omitted, which figure illustrates a modification in the driving means for the pump; and Fig. 9 is a cross-sectional view taken on the line 9—9 of Fig. 8 and looking in the direction of the arrows.

Referring to these drawings, A represents the casing of the pump and B a suitable pedestal therefor. The casing A is formed with axially alined and opposed cylinders 1 which each lead to a central chamber 2. Slidable in the cylinders 1 are pistons 3 which are rigidly interconnected by a single piston rod 4. Mounted centrally in the casing A and transversely with relation to the piston rod 4 is a main shaft 5 (best shown in Fig. 3ᵇ), which extends partially within the chamber 2, and to the end of the shaft is fixed a crank 6.

The latter is constructed with an adjustable crank pin device, whereby the stroke of the pistons 3 may be varied, and this device will be described with particular reference to Figs. 6 and 7. Mounted in the crank 6 in parallel relation to shaft 5 is a worm wheel 7 and in mesh therewith is a worm 8 which is rotatably mounted transversely to the wheel 7. The latter may be clamped in its adjusted position against rotation by a bolt 9, which passes through the split end of the crank 6, as clearly shown in Fig. 7. Integrally formed with the worm wheel 7 is a crank pin 10, which is arranged in eccentric relation thereto and connected by a link 11 to the piston rod 4, as clearly shown in Fig. 6. Both the worm 8 and clamping bolt 9 are arranged to be turned by a socket wrench or other suitable means applied through the hole 12 shown in Fig. 3ᵇ. By loosening bolt 9 and then turning the worm 8, the position of the pin 10 relative to shaft 5 may be varied to change the stroke of pistons 3 in an obvious manner.

Formed in the casing A below the cylinders 1 is an inlet passage 15, which may be connected to a supply tank by a pipe 16 extending through the hollow pedestal B. The ends of the cylinders 1 are connected to this passage 15 by clack valves 17, which are held to their seats by gravity and are raised to admit liquid into the cylinders 1 by the suction of the pistons 3. These valves are prevented from lifting too far by projections 18 which are integrally formed with and extend inwardly from the cylinder heads 19. The pistons 3 comprise simple ring castings formed with a plurality of holes 20 therethrough (see Figs. 2 and 3ᵇ). The latter are closed on the delivery side of the pistons by circular leather disks 21, which are held against the pistons by springs 22. The latter are spirally wound in conical shape, and, when clamped in compressed condition between the pistons 3 and washers on the piston rod 4, as shown in Figs. 2 and 3ᵇ, exert their tension on the disks 21. These springs 22, aided by the force of the liquid delivered, securely force the disks 21 against the pistons to seal the holes 20 on the suction stroke. On the return stroke, the leather disks 21 yield to permit the liquid to pass therethrough into the chamber 2 and out through an outlet pipe 23 (see Fig. 3ᵇ). This piston valve construction is simple, efficient, and requires a minimum of attention and repair.

Referring more particularly to Figs. 1, 3ᵇ, and 5, the crank shaft 5 is arranged for continuous rotation by a crank handle 25. The latter is recessed as shown in Fig. 5 to receive a ratchet wheel 26 which is pinned to shaft 5. Pivotally mounted within the handle is a pawl 27 which is held in engagement with wheel 26 by a spring 28 fixed at one end to the handle 25. This ratchet arrangement provides for actuation of shaft 5, when the handle is turned in one direction, and permits the handle to be turned without actuation of the shaft 5, when the handle is turned in the other direction. One reason for the arrangement described is due to the provision of means to lock the pump against unauthorized operation, which is desirable in measuring pumps. Since these pumps are used in public places and the operation thereof is simple and generally well understood, theft of gasolene would be an easy matter without some locking means. Such a locking means is shown in Figs. 3ᵇ and 5 and is of the type disclosed in the patent to Charles E. Fairbanks, No. 1,165,658, granted Dec. 28, 1915. It comprises essentially a spring lock 30, operable by a key from without the handle, and pin 31 which is normally held retracted by a spring 32. When the handle 25 is brought into the position shown in Figs. 1 and 3ᵇ, the pin 31 may be pushed into a hole in the casing A, and, when thus pushed inwardly, the latch of lock 30 engages a notch in the pin and holds it in its moved position. If desirable, the handle 25 may be locked to the housing for the gears 35, 36, and 37, as shown in Fig. 8. The lock and pin are disposed within the handle, as shown in Figs. 3ᵇ and 5 and, when the latter is locked, access to the locking devices is prevented by the casing A. The ratchet arrangement permits the handle 25 to be turned without actuation of the shaft 5 so that no matter what position the handle occupies, when pumping stops, it may be brought into locking position and locked without further delivery by the pump.

The pump structure previously described is designed to deliver a definite measured quantity (such as a gallon, for example) at each revolution of the crank handle 25. During each revolution of the latter, both pistons 3 are moved through a complete cycle, so that irrespective of the positions of the pistons at starting, a constant quantity is delivered. This quantity may be varied by the variable throw crank described until it is exactly the amount desired, say, for example, a gallon. Where the standard unit differs from the standard used in this country, as does the gallon in Canada, the pistons may be readily adjusted to conform with the desired standard. From the above description, it is clear that the adjustment of the pump to the desired standard does not involve the setting of any of the pump parts other than the eccentric crank pin. It is desirable to visually indicate to the customer the number of gallons delivered. This is accomplished by mechanism now to be described, wherein the number of revolutions of the shaft 5 are correctly counted, and the quantities dispensed from the pump are correctly indicated in units of the standard determined by the above described setting of the pump by a suitably graduated dial.

Fixed to the shaft 5 is a pinion 35 which drives, through gears 36 and 37, a shaft 38 arranged above and in parallel relation with shaft 5. The shaft 38 drives a total register 39 of the cyclometer type (see Fig. 3ᵇ) by means of suitable connections with the end of the shaft, which are not specifically illustrated as they are generally well understood in the art. This register 39 can, of course, be used to indicate the quantities dispensed to each customer, but, since its readings are cumulative, some computation is required when thus used, and it is preferable to provide another indicating device for this purpose, which may be conveniently reset to zero after each operation of the pump. This device will now be described with particular reference to Figs. 1, 2, 3ᵃ, and 4. Mounted on a hollow column C secured to the casing A is a cylindrical casing D and fixed therein are two spaced dials 40, which are graduated, as shown in Fig. 1, to indicate the quantities dispensed in suitable units, such as, gallons, for example, and is provided with relatively large numerals, easily readable by the customer. These dials 40 are secured to and held in spaced relation by a casting E (best shown in Fig. 4) and mounted therein is a spindle 41. Loosely mounted on the latter are sleeves 42, one on either side of the member E, and fixed to the outer ends of the sleeves are pointers 43, which are movable over the outer faces of the dials 40. These sleeves 42 have integral flanged portions 44 and formed on the outer surfaces thereof are small teeth 45, as clearly shown in the left-hand portion of Fig. 3ᵃ. Loosely mounted on the sleeves 42 are disks 46 formed with notches to mate with the teeth 45 on flanges 44 and fixed to the outer surfaces of these disks at 47 are spiral springs 48 (see Fig. 4). The other end of each spring 48 is fixed at 49 to the dials 40. The flanges 44 are riveted to crown gears 50, as shown in Fig. 3ᵃ, whereby, when the latter are turned by means to be described, the pointers 43 are moved, and the springs 48 are wound up by the rotation of the disks 46. The springs 48 tend to hold the elements 44 and 46 in mating engagement, as indicated in Fig. 3ᵃ, and the disks 46 are arranged, when the springs 48 have been wound up by a complete revolution of the pointers 43, to slip and prevent further winding and possible breakage of the springs.

Vertically disposed within the column C and rotatably mounted in the frame E is a shaft 53, the upper end of which is formed with a pinion 54, adapted to mesh with each crown gear 50. A shaft 55 in alinement with the shaft 53 is driven by the bevel gears shown in Fig. 3$^b$ from the shaft 38 previously described. These shafts 53 and 55 are interconnected by a sleeve 56, which is pinned to the former and has a pin and slot connection with the latter, all as clearly shown in Fig. 3$^a$. A spring 57, within the sleeve, tends to hold the shaft 53 in a position, wherein the pinion 54 meshes with the gears 50. Loosely mounted on the shaft 53 and above the sleeve 56 is a member 58 and fixed thereto is a pin 59, which extends outwardly through the pedestal C in a suitable slot, as shown in Figs. 1 and 3$^a$.

The pin 59 permits depression of the shaft 53 to withdraw the pinion 54 from mesh with the gears 50, and, while thus depressed, the springs 48 are arranged to unwind and by the coaction of members 44 and 46 to return the pointers 43 to zero position. To insure the return of the pointers accurately to zero position, stops 60 and 61 are provided, as shown in Fig. 4. The former are fixed to the gears while the latter are pivoted at 62 to the member E and, on return movement of the pointer (in a counter-clockwise direction), are adapted to abut with one another to hold the gears 50 and thus the pointers 43 accurately positioned at zero. The springs 48 are arranged with some tension, when the pointers are at zero, so that the stops 60 are positively held against the stops 61. The latter are held in the position shown in Fig. 4 by engagement of the rearward portions with the member E but, by their movable mounting, permit the stops 60 to pass freely in a clockwise direction in case the pointers 43 should make more than one complete revolution.

In operation, the stroke of the pistons 3 is adjusted until the desired quantity, for example, one gallon, is delivered by one rotation of the handle 25. The revolutions of shaft 5 are then counted by the connections described on the register 39 and dials 40, and each revolution thus counted indicates a gallon dispensed from the pump. The dials 40 clearly show to the customer the amount delivered no matter whether he is one side or the other of the pump or at a distance therefrom. Assuming that the desired quantity has been delivered, the pointers 43 are reset by depressing the pin 59 as already described, and it is then desired to lock the handle 25 to the pump without further actuation thereof. The ratchet construction shown in Fig. 5 permits the handle 25 to be turned with relation to shaft 5 to bring it into such a position that the pin 31 may be pushed into the hole in casing A, as shown in Fig. 3$^b$, without operation of any of the other pump parts.

It is believed to be desirable in measuring dispensing pumps that the operating handle, as 25, should turn smoothly under a uniform effort applied thereto. Where, however, as in this case, a crank is used to convert rotary into reciprocatory motion, it is well known that for uniform linear motion of the pistons 3, the rotary motion of the handle 25 is non-uniform. The greatest difference occurs, when the crank is on either of its dead centers, and little effort is then needed to turn the handle. In practice, however, the operator applies a substantially constant force to the operating handle, and, consequently, the handle jumps twice in each cycle of operation of the pump. Therefore, to make the resistance to turning substantially uniform throughout the cycle, the device shown in Figs. 8 and 9 is provided, which will now be described. Fixed to the shaft 5 is a member 65, which has two cams 66 arranged at 180 degrees to one another. Slidably mounted in a part of the frame A below the member 65 is a plunger 67, the upper face of which is arrranged in the path of the cams 66. The plunger is limited in its upward travel to the position shown in Figs. 8 and 9, wherein the head 68 abuts an interior flange in the hole in frame A. When moved downwardly by the cams 66, the plunger 67 compresses a spring 69, the tension of which is adjustable by the screw 70. In operation, the cams 66 are so positioned on the shaft 5 that they come into engagement with the plunger 67 as the pistons near the end of their stroke and withdraw from the plunger shortly after the pistons start on the return stroke. The resistance offered by the plunger increases to a maximum, when the dead center position has been reached, and thereafter again decreases. Thus, this device provides for substantially uniform resistance to turning, whereby the handle 25 turns smoothly under a constant effort applied thereto.

It will thus be seen that the pump is arranged to measure and deliver a continuous flow of liquid, as distinguished from the piston pumps in general use, heretofore, wherein the flow is intermittent. Moreover, delivery commences immediately, when the handle is turned, and irrespective of the position of the pistons. The latter need not be brought to predetermined positions before pumping is commenced, as such positioning is immaterial, since one revolution of the handle 25 will cause a complete cycle of operation of the pump, and such a cycle results in the delivery of a measured unit quantity. It is not necessary to place measuring stops in the path of the pump actuating member, as heretofore, to gage the movement thereof. The measuring takes place automatically without effort on the part of the operator, and the latter simply turns the handle 25 continuously in one direction until the desired quantity has been delivered as indicated by the pointers 43. The idle return stroke, heretofore present in measuring pumps of the piston type, is eliminated, and the movements of the handle 25 are effective and result in delivery. After the desired quantity has been delivered, it is not necessary that the pistons be restored to a certain position. They are left in whatever position they happen to occupy, and the handle is turned in the opposite direction to locking position and locked. Thereafter, no one, not authorized, can actuate the pump. On a subsequent operation of the pump, measurement is started from whatever position the pistons occupy by the counting of cycles from this point by the apparatus described.

Thus, an improved dispensing and measuring pump has been provided which is simple, convenient, and efficient in operation and which is arranged for accurate and automatic measurement of the output. It is recognized that various modifications may be made in the structure herewith described for illustrative purposes without departing from the scope of the invention which is defined by the appended claims rather than by the foregoing description of one specific manner of putting the invention into practice.

What I claim is—

1. The combination in a double acting dispensing and measuring piston pump with the pistons thereof, of means operable by continuous rotation in one direction to reciprocate the pistons, an adjustable device associated with said means to vary the stroke of said pistons to effect the delivery of an accurately measured unit quantity for each cycle of operation of the pump, and apparatus continuously operable from said means to count the cycles of operation and any parts thereof and thus indicate the number of measured unit quantities dispensed from the pump, said apparatus being constructed and arranged so that measurement is commenced immediately on movement of the pistons irrespective of the position thereof in the cycle of operation.

2. The combination in a double acting dispensing and measuring pump with the pistons thereof, of means operable by continuous rotation in one direction to reciprocate the pistons, means to adjust the stroke of the pistons to effect the delivery of an accurately measured unit quantity for each cycle of operation of the pump, a registering device continuously operable from the first named means to count the cycles of operation and thus indicate the quantities dispensed from the pump, and manually releasable mechanism automatically operable when released to reset said registering device to zero position without actuating the first-named means.

3. A dispensing and measuring pump, comprising, in combination, a casing formed with opposed cylinders, and a common central outlet therefor, interconnected pistons slidable in said cylinders and arranged to force liquid into said chamber, means operable by continuous rotation in one direction to reciprocate said pistons, mechanism associated with said means to vary the stroke of the pistons, whereby the pump may be adjusted to deliver a definite accurately measured quantity for each rotation of said means, and devices continuously operable from said means to indicate the number of revolutions and parts thereof and thus the quantities dispensed from the pump, all constructed and arranged for a continuous delivery of liquid by a continuous rotation of said means.

4. A dispensing and measuring pump, comprising, in combination, a casing formed with a pair of cylinders arranged in opposed relation and opening into a common outlet, interconnected pistons in said cylinders arranged to alternately deliver liquid to said outlet, whereby a continuous flow is obtained, a crank shaft and a handle associated therewith operable by continuous rotation in one direction to reciprocate said pistons, devices associated with said crank shaft to vary the stroke of said pistons, whereby the latter may be adjusted to deliver a definite accurately measured unit quantity for each revolution of said shafts, apparatus continuously operable from said shaft to count the revolutions thereof and thus indicate the number of units dispensed, mechanism to lock said handle against rotation, and means associated with said handle to permit the latter to be turned to locking position without actuation of said shaft.

5. A dispensing and measuring pump, comprising, in combination, opposed pump cylinders having a common outlet, interconnected pistons in said cylinders arranged alternately to force liquid into said outlet, whereby a continuous flow is provided, a crank shaft, devices connecting the shaft and said pistons to adjust the latter to deliver a definite accurately measured unit quantity for each cycle of operation thereof, an operating handle on said shaft, arranged on continuous rotation in one direction to reciprocate said pistons, means to lock the handle, devices associated with the handle to permit the latter to be turned to locking position without operation of said shaft, apparatus continuously operable from the shaft to count the revolutions thereof and thus the unit quantities dispensed from the pump, and mechanism to reset said apparatus to zero position without actuating said shaft.

6. A dispensing and measuring pump, comprising, in combination, opposed cylinders having a common outlet, interconnected pistons in said cylinders operable to alternately force liquid through said outlet, a crank shaft, devices connecting said shaft and pistons operable to adjust the latter to deliver an accurately measured unit quantity for each cycle of operation thereof, an operating handle on said shaft arranged on continuous rotation in one direction to reciprocate the pistons and deliver a continuous flow of liquid from the pump, and mechanism geared up to said shaft to count the revolutions thereof and thus the number of unit quantities dispensed, said mechanism continuously operable with said shaft to indicate the quantity dispensed at any instant in the cycle of operation of the pump, all constructed and arranged for immediate delivery and accurate measurement thereof on actuation of the handle irrespectively of the starting position of the pistons in said cylinders.

7. A dispensing and measuring pump, comprising, in combination, a casing formed with opposed cylinders and a common outlet chamber, pistons in said cylinders, a rod connecting said cylinders, a shaft mounted transversely in said casing, an actuating device on the shaft outside the casing, a crank on the shaft within the chamber, a worm wheel rotatable in the crank having a pin eccentrically mounted thereon, a link connecting the pin and said rod and means to turn said worm wheel, whereby the throw of the crank may be varied to change the stroke of the pistons, said means comprising a worm rotatably mounted in the crank and in mesh with the worm, all constructed and arranged for adjustment of the pistons to deliver a definite accurately measured unit quantity for each revolution of said shaft, said means and associated mechanism arranged entirely within said chamber in a position not readily accessible from without the casing.

8. The combination, in a double acting dispensing and measuring piston pump with the frame and pistons thereof, of a crank shaft operatively connected with the pistons to reciprocate the latter on rotation of said shaft, a crank handle to return the latter and means whereby the resistance to turning of the shaft is made substantially uniform throughout the cycle of operation of said pistons, said means comprising coöperating members one on said frame and one on said shaft arranged to periodically engage as the pistons approach the ends of their strokes, one of said members being yieldable and arranged to exert a gradually increasing and then a gradually decreasing frictional resistance on the other member, whereby said crank handle may turn smoothly under a constant effort throughout the cycle of operation of the pistons.

9. The combination in a double acting dispensing and measuring piston pump with the pistons thereof, of means operable by continuous rotation in one direction to reciprocate the pistons, an adjustable device associated with said means to vary the stroke of said pistons to effect the delivery of an accurately measured unit quantity for each cycle of operation of the pump, a registering device geared up to said means to turn in unison therewith, said registering device arranged to indicate the quantities dispensed from the pump, a device to interrupt the driving connections between said means and registering device, and automatic means associated with the latter to reset the register to zero, all constructed and arranged so that measurement is commenced immediately on movement of the pistons irrespective of the position thereof in the cycle of operation.

JOHN B. DAVIS.